United States Patent [19]

Mueller-Schloer

[11] Patent Number: 4,458,109

[45] Date of Patent: Jul. 3, 1984

[54] METHOD AND APPARATUS PROVIDING REGISTERED MAIL FEATURES IN AN ELECTRONIC COMMUNICATION SYSTEM

[75] Inventor: Christian Mueller-Schloer, Vorhees, N.J.

[73] Assignee: Siemens Corporation, Iselin, N.J.

[21] Appl. No.: 346,227

[22] Filed: Feb. 5, 1982

[51] Int. Cl.$^3$ ............................................. H04L 9/00
[52] U.S. Cl. .............................. 178/22.11; 178/22.08; 178/22.16
[58] Field of Search ................ 178/22.08, 22.11, 22.16

[56] References Cited

U.S. PATENT DOCUMENTS

| | | | |
|---|---|---|---|
| 4,193,131 | 3/1980 | Lennon et al. | 178/22.08 |
| 4,264,782 | 4/1981 | Konheim | 178/22.08 |
| 4,326,098 | 4/1982 | Bouricius et al. | 178/22.08 |
| 4,349,695 | 9/1982 | Morgan et al. | 178/22.08 |
| 4,393,269 | 7/1983 | Konheim et al. | 178/22.08 |

OTHER PUBLICATIONS

NBS Special Pub., 500–554 (10/79), A Key Notarization System for Computer Networks, Smid.

*Primary Examiner*—Sal Cangialosi

*Attorney, Agent, or Firm*—Karl F. Milde, Jr.

[57] ABSTRACT

The method and the apparatus provide a security feature in an electronic communication system which contains a first and a second terminal and a communication network. The first terminal is designed for sending a message to the second terminal. A security service station is provided to communicate with the first and second terminals via the communication network. In the first terminal a key is generated at random which is used for encrypting the message, thereby obtaining a first encrypted message. A first quantity of data defining this first encrypted message and the random key form a composed data quantity which is encrypted with a first secret key. This key is specifically assigned to the first terminal. A first encrypted composed quantity of data is obtained which is sent from the first terminal to the security service station.

The first encrypted message is transmitted from the first terminal to the second terminal. Here, a second quantity of data defining the first encrypted message is derived. This quantity of data is encrypted with a second secret key which is specifically assigned to the second terminal. Thereby, a second encrypted quantity of data is obtained which is sent to the security service station.

16 Claims, 7 Drawing Figures

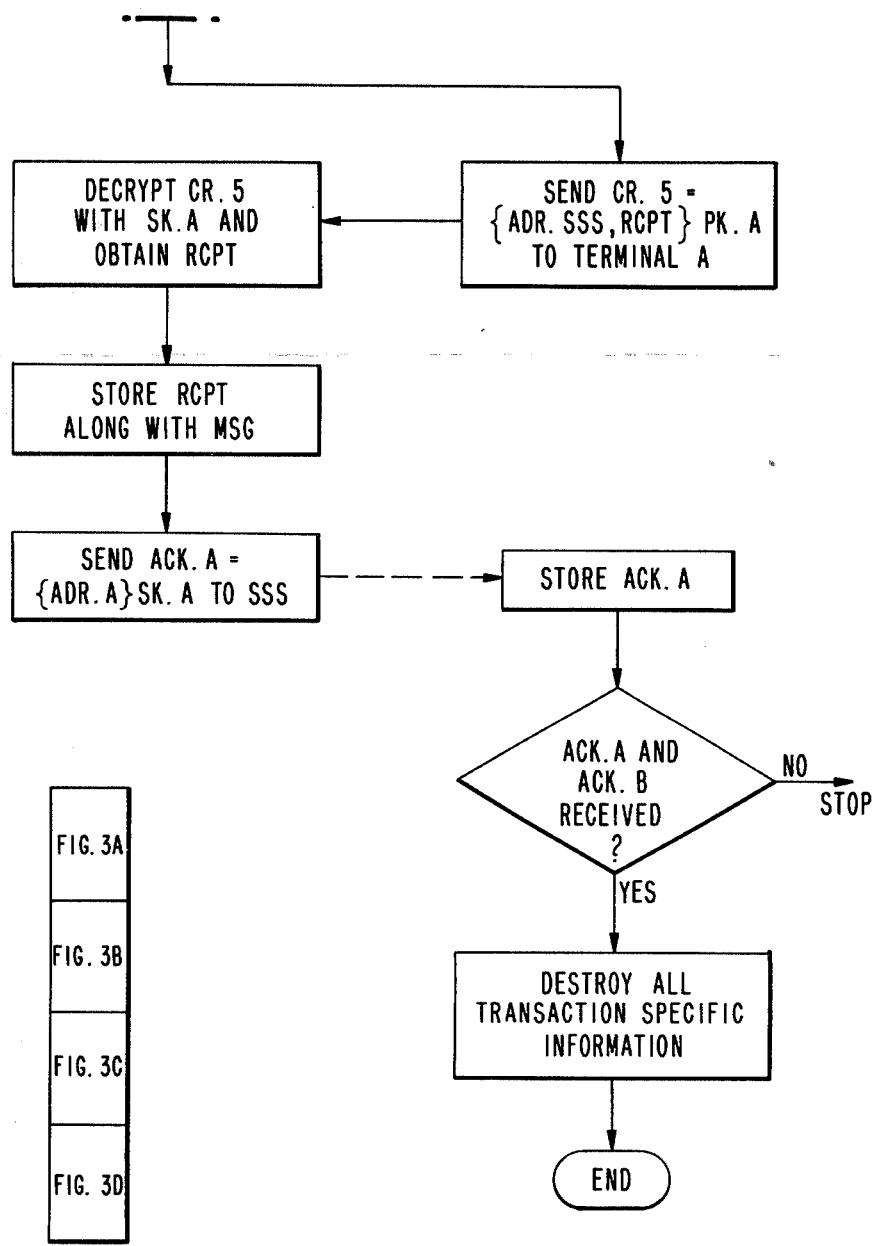

METHOD AND APPARATUS PROVIDING REGISTERED MAIL FEATURES IN AN ELECTRONIC COMMUNICATION SYSTEM

CROSS REFERENCE TO RELATED APPLICATION

This invention relates to a similar field as the commonly owned U.S. patent application entitled "Apparatus and Method for Cryptographic Identity Verification" by Dr. Christian Mueller-Schloer, Ser. No. 256,523, filed on Apr. 22, 1981, and now abandoned.

BACKGROUND OF THE INVENTION

1. Field of the Invention

This invention relates to an electronic communication system. In particular, this invention relates to a method and an apparatus which provide the features of the commonly known Registered Mail in an electronic communication system.

2. Description of the Prior Art

In a presently known electronic communication system (see, for instance, article "A Prototype for the Automatic Office" by Robert B. White, *Datamation*, April 1977, pp. 83-90) messages are edited, then sent from a sender and finally received by the mailbox of a receiver. There may be a large number of receivers, and receiving is, for instance, according to a distribution list. To a certain extent, the presently known electronic mail systems of this type can replace the conventional paper mail system effectively.

Also simple security features such as secrecy features have been conceived for communication systems. For instance, symmetrical key systems, such as the well-known DES (Data Encryption Standard, see National Bureau of Standards, Federal Information Standard FIPS Publication 46, U.S. Department of Commerce, Washington, D.C.; January 1977) have been used in conjunction with electronic communication systems. However, these security features are relatively simple. Especially a security method and a security system providing the same features and advantages as the conventional Registered Mail System have not yet been suggested in connection with fully electronic digital communication systems. When the transmission of a message from a sender A to a receiver B is considered, the conventional paper/envelope Registered Mail System in most Postal Services provides the following features:

(a) The receiver B must sign a receipt before he can receive a message. The receipt is returned to the sender A.

(b) The sender A is not able to change the message for which he has obtained the receipt from the receiver B.

(c) The receiver B is neither able to successfully fully disclaim having received a message after he has signed the receipt, nor to change the message.

(d) In some mail system there is a procedure which can be referred to as a "time stamp mechanism". In the course of this procedure, the point of time of the transaction, in particular of the releasing of the letter to the receiver, is marked. Thus, the time of the transaction is traceable by a third party, for instance, in court, when the transaction is disputed.

An electronic Registered Mail System should have the above-mentioned features (a), (b) and (c). It preferably should also have the feature (d).

SUMMARY OF THE INVENTION

1. Objects

It is an object of this invention to provide a method and an apparatus which provide registered mail features in an electronic communication systems.

It is another object of this invention to provide registered mail features in a presently known fully electronic digital communication system which contains at least two terminals and a communication network.

It is still another object of this invention to provide a method and an apparatus incorporating registered mail features wherein failures, interruptions or attempts of fraud or falsification are excluded or easily detectable.

Still other objects will become apparent in the course of the following description.

2. Summary

According to this invention, a method for providing a registered mail feature in an electronic communication system is provided. It is assumed that the electronic communication system contains at least a first and a second terminal, and a communication network. It is also assumed that the first terminal sends a message to the second terminal. The method comprises the following steps:

(a) generating a key at random in the first terminal;

(b) encrypting the message to be sent with the generated random key, thereby obtaining a first encrypted message;

(c) sending the first encrypted message to the second terminal;

(d) encrypting a first quantity of data which defines the first encrypted message and the random key with a first secret key, which key is specifically assigned to the first terminal, thereby obtaining a first encrypted composed quantity of data;

(e) sending the first encrypted composed quantity of data (including the generated key) either in an encrypted or in an unencrypted form from the first terminal to a security service station;

(f) in the second terminal encrypting a second quantity of data defining the received encrypted message with a second secret key which is specifically assigned to the second terminal, thereby obtaining a second encrypted quantity of data;

(g) sending the second encrypted quantity of data from the second terminal to the security service station.

(h) in the security service station, decrypting the first encrypted composed quantity of data received from the first terminal, thereby obtaining the first quantity of data and the random key, decrypting the second encrypted quantity of data received from the second terminal, thereby obtaining the second quantity of data, and authenticating the first and the second terminal;

(i) in the security service station, comparing the first quantity of data with the second quantity of data;

(j) if these quantities of data are equal to each other in the security sevice station, preparing a signed receipt containing the random key;

(k) sending the receipt to the first and second terminal; and (l) in the second terminal, decrypting the first encrypted message received from the first terminal with the random key contained in the receipt, thereby obtaining the message in clear text.

It should be pointed out that, speaking in terms of time, the order of some of the afore-mentioned steps (a) to (l) may be changed. For instance, the encrypted message may first be sent to the security service station and then to the second terminal.

Thus, the invention makes use of the concept of a security service station and of a pair of network keys, namely a public network key and a secret network key.

According to this invention, an apparatus for message acknowledgement in a communication system provided for transmitting digital data contains a communication network for transmitting digital data, a first terminal, a second terminal, and a security service station connected to the communication network of the system.

The first terminal contains a first central processing unit having associated therewith a first memory for storage of a program, of a public network key, of a first public user key, of a first secret user key, and of variables. The first terminal also contains a non-volatile storage device (such as a memory chip) for storing at least a message and a receipt. The first terminal also contains an input terminal for introducing the message into the first memory under the control of the first processing unit. And the first terminal also contains a first crypto module which is connected to the first central processing unit. This first crypto module is adapted to encrypt and decrypt data which are received from the first memory under the control of the first central processing unit. Besides other tasks, the first crypto module is provided for encrypting the message. The encrypted message can be introduced from the first terminal into the communication system.

The second terminal has a similar design. It contains a second central processing unit having a second memory for storage of a program, of the public network key, of a second public user key, of a second secret user key, and of variables. The second terminal also contains a second non-volatile storage device and a second crypto module connected to the second control processing unit. It further contains an output for delivering the message.

The apparatus for message acknowledgement also contains a security service station. This security service station incorporates a third central processing unit having a third memory for storage of a program, of a secret network key, of public user keys, and of variables. It also incorporates a third non-volatile storage device and a third crypto module connected to the third central processing unit. The crypto module is adapted to encrypt and decrypt data received from the third memory under the control of the third central processing unit.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
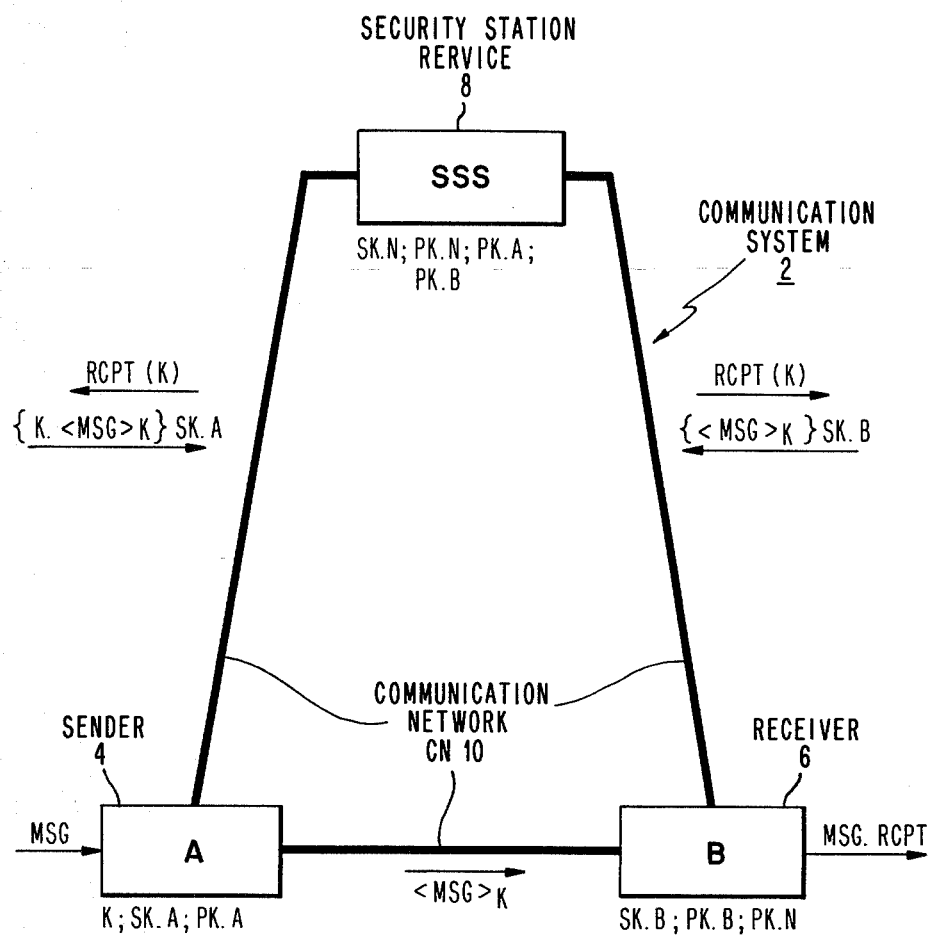
FIG. 1 is a schematic diagram illustrating principles of an apparatus for message acknowledgement in an electronic communication system according to the invention.

In FIG. 1 is schematically illustrated an electronic communication system 2 which provides for message acknowledgement, in particular for a registered mail feature, when messages MSG comprised of digital data are transmitted. The communication system 2 contains a first terminal 4 (also denoted by A) working as a sender, a second terminal 6 (also denoted by B) working as a receiver, a security service station 8 (also denoted by SSS) working as an auxiliary station; and a communication network 10 (also denoted CN) working as a transmission means. The first terminal 4 is here provided for sending a message MSG to the second terminal 6, and the second terminal 6 is here provided for receiving and forwarding this message MSG. The security service station 8 is provided to communicate with the first and second terminal 4 and 6, respectively, via the communication network 10.

The first terminal 4 is designed to contain any suitable means which generates a random key K. It also contains a storage device for storing data specifically assigned to the first terminal 4, namely a secret key SK.A and a private key PK.A. The second terminal 6 is the same design as the first terminal 4. It contains a storage device for storing two keys which are specifically assigned to the second terminal 6, namely a secret key SK.B and a private key PK.B. The security service station 8 is basically of the same design as the terminals 4 and 6.

It is assigned and connected to the communication network 10. The security service station 8 contains a storage device for storing two keys, which are specifically assigned to the communication network 10, namely a secret network key SK.N and a public network key PK.N. In addition, it stores the public keys PK.A and PK.B of the terminals A and B.

The second terminal 6 is shown here as representative for any of a larger number of receiving terminals connected to the communication system 2.

The principles of a method which provide a registered mail feature in the communication system 2 according to FIG. 1 will now be outlined. In the following description, a Public Key Cryptosystem (PKC) encryption will be denoted by braces $\{\ldots\}$, whereas a Symmetrical System encryption, e.g., a DES encryption will be denoted by angle brackets $<\ldots>$. The steps are as follows:

Step 1: The first terminal 4 which has stored the message MSG generates a random key K.

Step 2: The first terminal 4, encrypts the message MSG to be transferred to the second terminal 6 under the random key K. The result is a first encrypted message $<MSG>_K$.

Step 3: The first terminal 4 sends the first encrypted message $<MSG>_K$ via the communication network 10 to the second terminal 6.

Step 4: The second terminal 6 encrypts the encrypted message $<MSG>_K$ with its own secret key SK.B. An encrypted quantity of data $\{<MSG>_K\}$ SK.B is obtained.

Step 5: The second terminal 6 sends this encrypted quantity of data $\{<MSG>_K\}$ SK.B to the security service station 8.

Step 6: The security service station 8 decrypts this encrypted quantity of data $\{<MSG>_K\}$ SK.B with the public key PK.B of the second terminal 6. This public key PK.B is stored in its storage device, as previously mentioned. As a result, the security service station 8 obtains the first encrypted message $<MSG>_K$.

Step 7: The security service station 8 provides for an authenticity check, that is, it determines whether the decryption with the public key PK.B leads to an intelligible result. In other words, the security service station 8 determines whether the terminal 6 in fact is the second terminal 6 and not an intruder.

Step 8: The first terminal 4 encrypts the first encrypted message $<MSG>_K$ and the random key K under its secret key SK.A. The result is the encrypted composed quantity of data $\{K, <MSG>_K\}$ SK.A.

Step 9: The first terminal 4 sends the encrypted composed quantity of data $\{K, <MSG>_K\}$ SK.A to the security service station 8.

Step 10: The security service station 8 decrypts this encrypted composed quantity of data $\{K, <MSG>_K\}$ SK.A with the public key PK.A stored in its memory. As a result, the first encrypted message $<MSG>_K$ and the random key K are obtained.

Step 11: The security service station 8 performs an "authenticity check", that is, it determines whether the decryption with the public key PK.A leads to an intelligible result. In other words, the security service station 8 determines whether the terminal 4 in fact is the first terminal and not an intruder.

The above-mentioned steps 3-7 represent a first sequence of steps, and the above-mentioned steps 8-11 represent a second sequence of steps. It will be noted that the first sequence of steps and the second sequence of steps may be interchanged without changing the final result. It may also be noted that some or all steps of the first sequence may overlap in time with steps of the second sequence. It may also be noted that certain steps of both sequences may be taken alternatingly. Thus, the step sequence may be, for instance, 1, 2, 8, 9, 3, 4, 5, 10, 11, 6, 12, 13, 14, 15, 16, 17. The wide variety of possibilities is due to the fact that the steps of the first sequence are independent from the steps of the second sequence.

Step 12: The security service station 8 compares the first encrypted message obtained from the second terminal 6 with the first encrypted message obtained from the first terminal 4. If both encrypted messages are equal, that is equal to $<MSG>_K$, then both terminals 4 and 6 agree upon the same message MSG encrypted under the random key K. Now, the next step can be taken.

Step 13: The security service station 8 generates a receipt RCPT in two steps.

a. A data quantity or receipt information RC is composed of the first encrypted message $<MSG>_K$, of the random key K and of the addresses of the terminals 4 and 6.

That is:
   RC=($<MSG>_K$; K; addrA; addrB).

b. Subsequently this data quantity or receipt information RC is encrypted with the secret network key SK.N, that is the station 8 "signs" with the key SK.N, thereby forming the receipt RCPT. That is:

RCPT={RC} SK.N={$<MSG>_K$; K; addrA; addrB} SK.N.

Step 14: The security service station 8 sends the receipt RCPT (containing the random key K) to both terminals 4 and 6. It will be noted that after having received the receipt RCPT(K), the second terminal 6 is enabled to determine the random key K, see step 15. This key K will be necessary in the terminal 6 to decrypt $<MSG>_K$, see step 16. The receipt RCPT(K) is stored in both terminals 4 and 6.

Step 15: The second terminal 6 extracts or determines the random key K from the receipt RCPT(K) by decryption with the public network key PK.N.

Step 16: Subsequently, the second terminal 6 decrypts the first encrypted message $<MSG>_K$ with the random key K, thereby obtaining the message MSG in clear text. The message MSG may be stored in the second terminal 6 together with the receipt RCPT.

Step 17: The message MSG and optimally the receipt RCPT may subsequently be displayed by the second terminal 6.

It will be realized that after step 14 has been performed, the first terminal 4 has stored the message MSG as well as the receipt RCPT(K) received from the security service station 8. This enables the user of the first terminal 4 to prove at any given point of time that the second terminal 6 has in fact received the message MSG. More details will be given later in FIG. 6 referred to as "Dispute Diagram".

Figure 2:
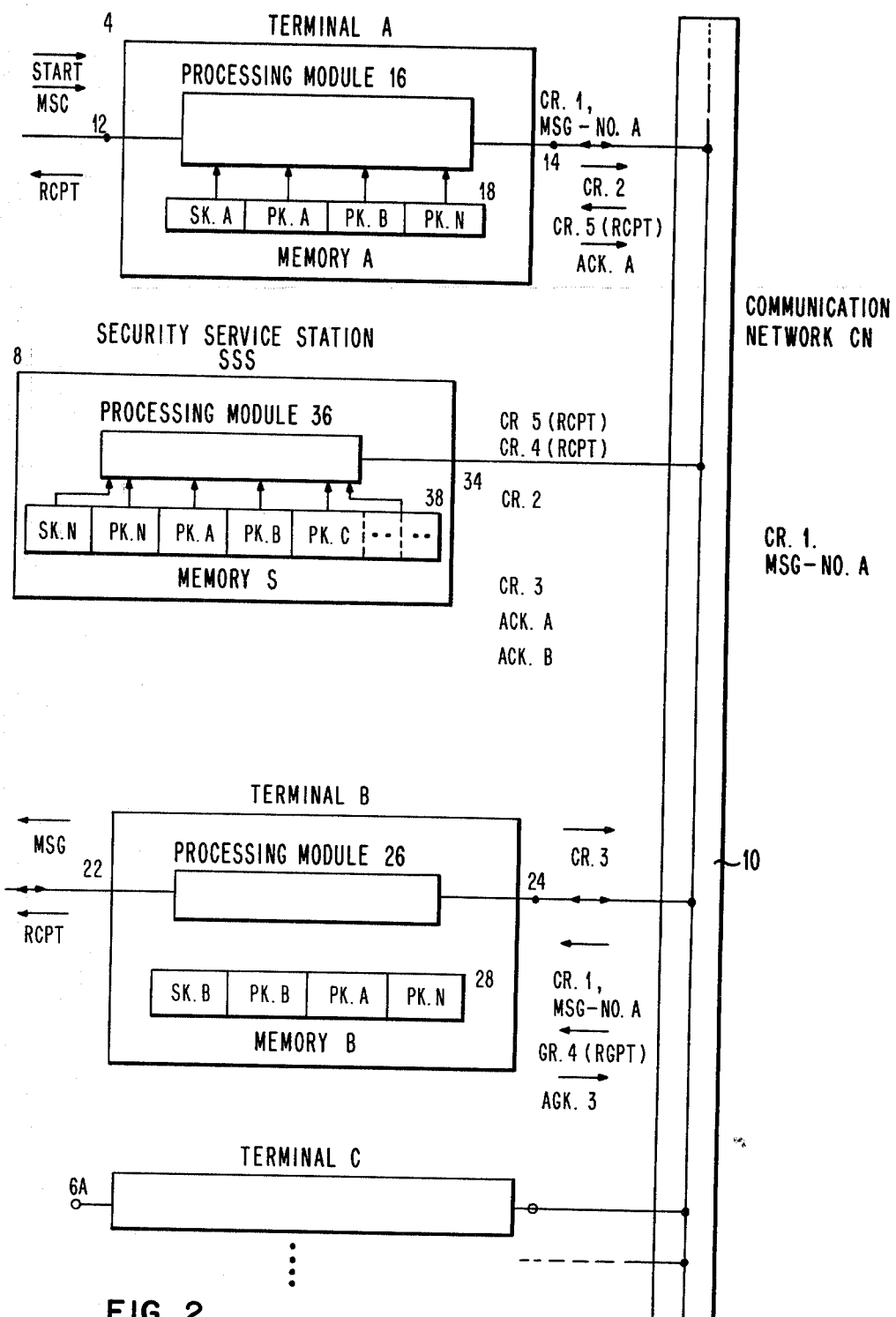
FIG. 2 is a more detailed diagram of a communication system incorporating an apparatus for message acknowledgement according to the invention.
Figure 3A:
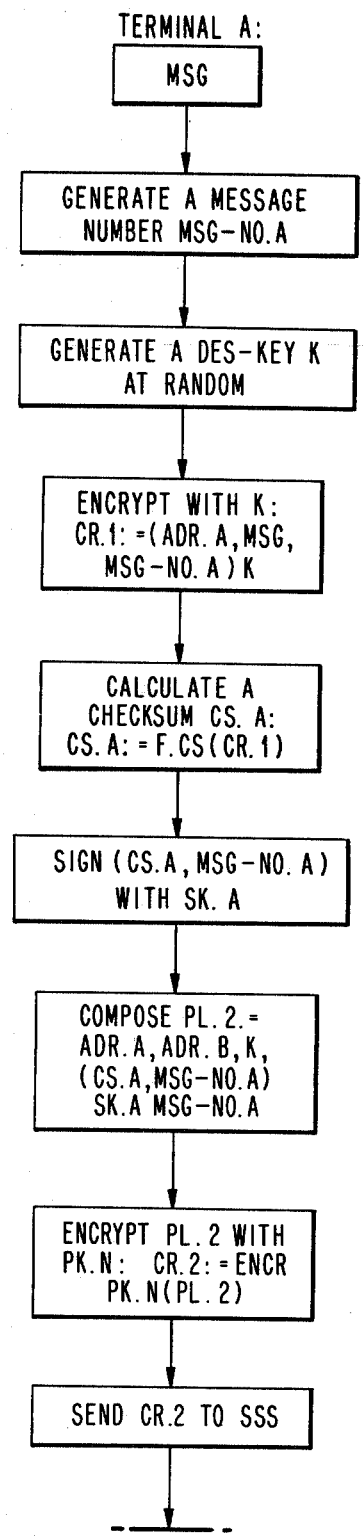
FIG. 3 is a flow-chart illustrating various steps in the data transfer between the individual components of the communication system shown in FIG. 2.
Figure 3A:
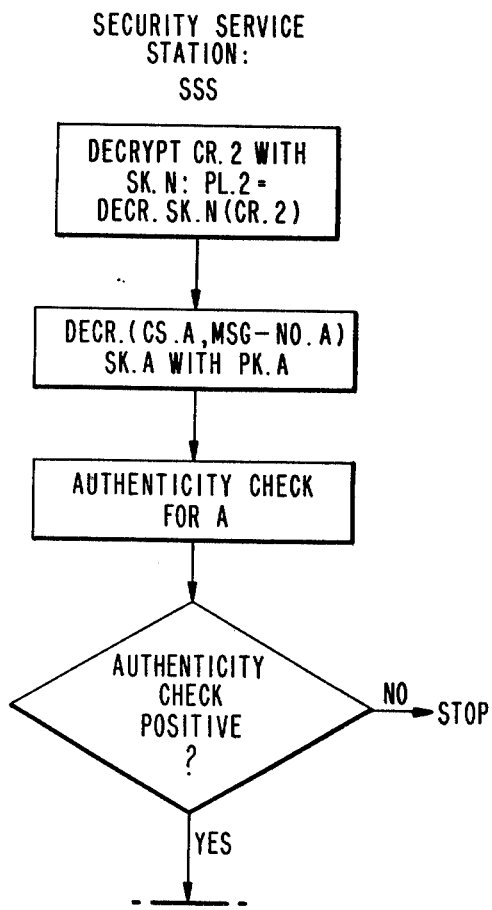
Figure 3B:
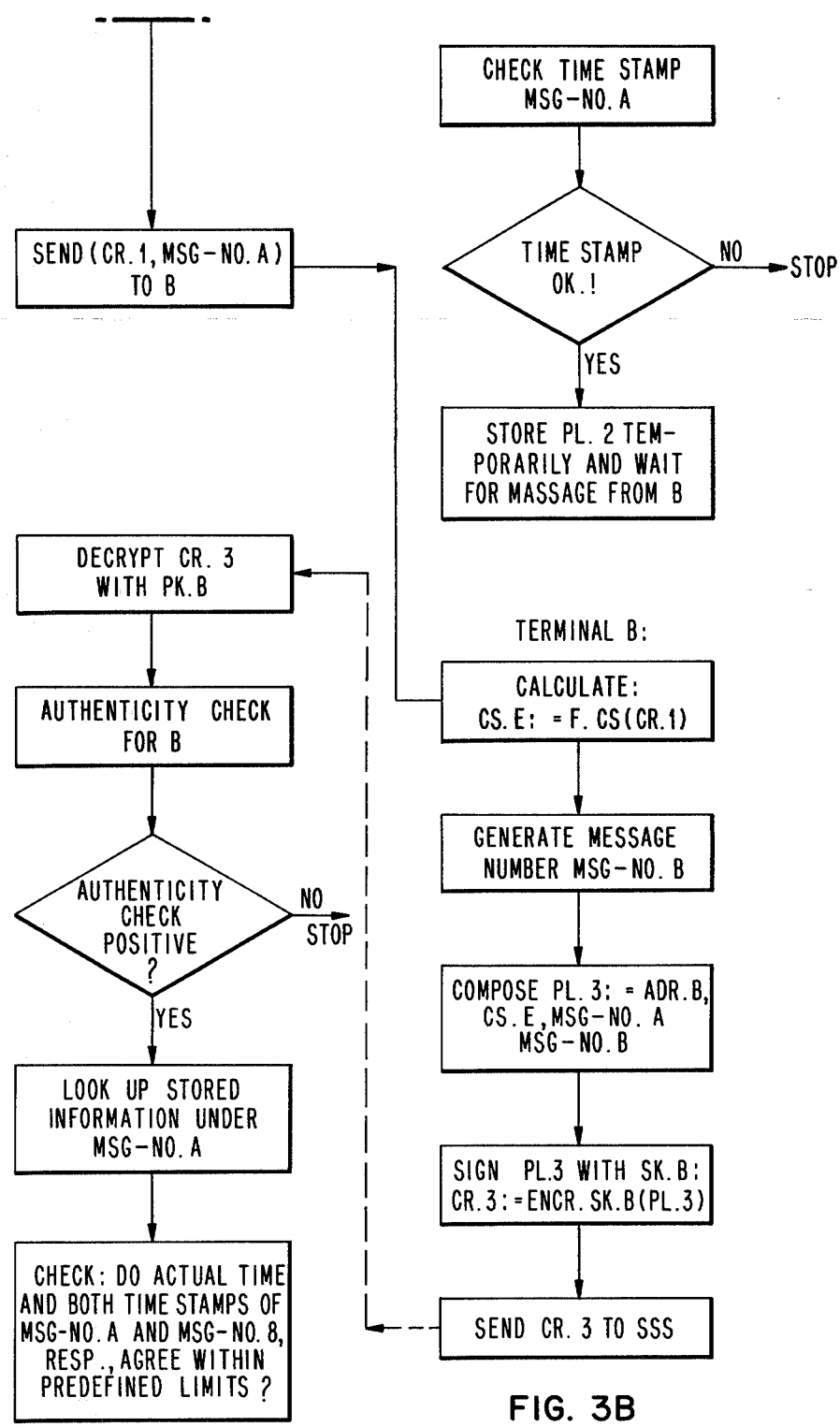
Figure 3C:
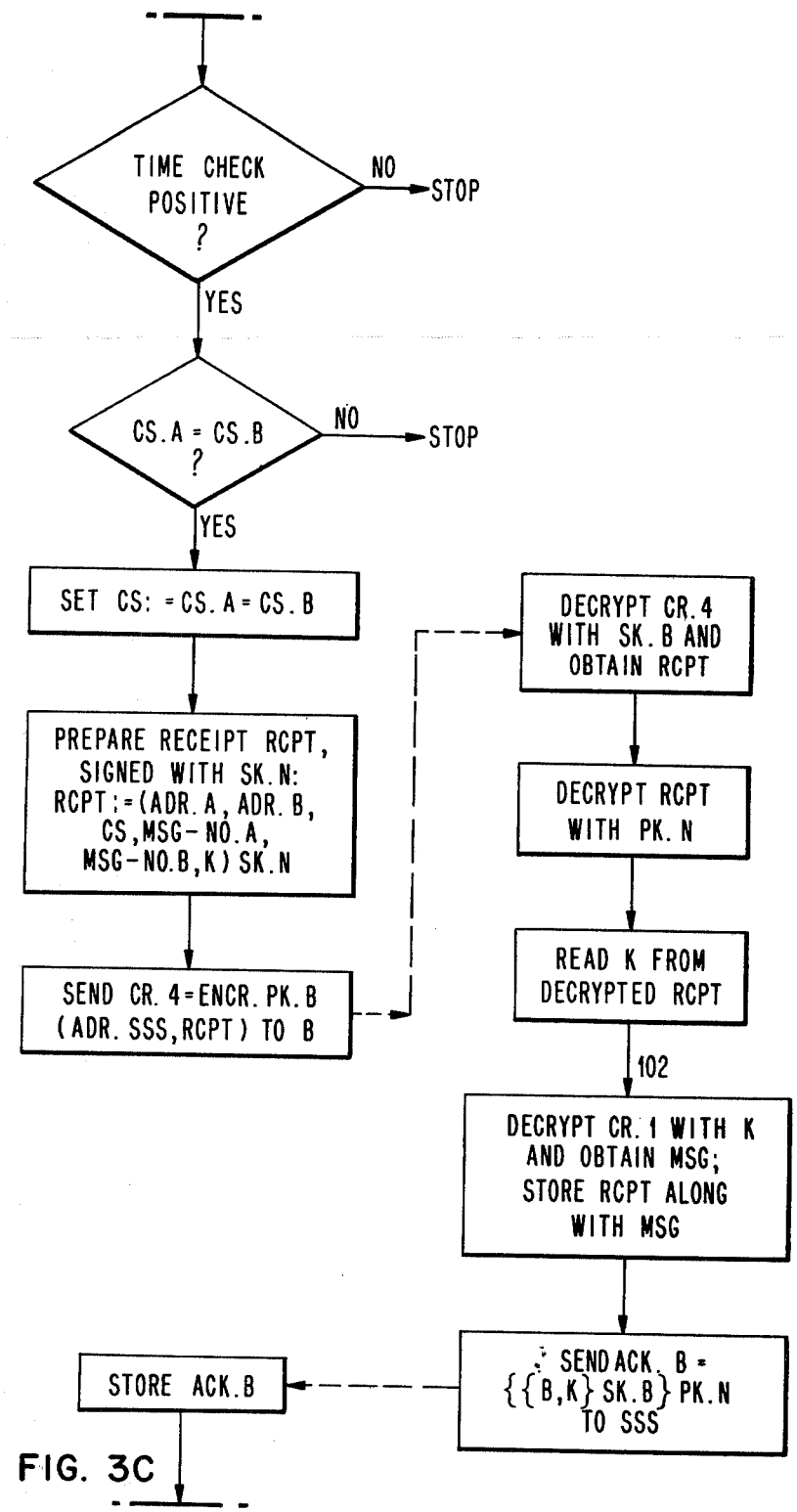

In the more detailed embodiment illustrated in FIGS. 2 and 3, the first encrypted message $<MSG>_K$ which (according to step 3) is sent from the first terminal A to the security service station SSS is replaced by a checksum CS.A, and the encrypted quantity of data $\{<MSG>_K\}$ SK B which (according to step 5) is sent from the terminal B to the security service station SSS is replaced by a second checksum CS.B. As will be explained later, the first checksum CS.A is formed by introducing the encrypted message $<MSG>_K$ into a checksum generator.

In FIG. 2 an embodiment of a communication system 2 is illustrated in more detail. This communication system 2 carries out a method providing a registered mail feature which will be also explained with reference to FIG. 3.

According to FIG. 2, the communication system 2 again contains a first terminal 4, a second terminal 6, a third terminal 6a (also denoted by C) and further terminals 6b, 6c, . . . which are not shown in detail. The terminals 4, 6, 6a, . . . are connected to a communication network 10 for exchange of digital data. Connected to the communication network 10 is also a security service station 8. It will be noted that the terminal 4, 6, 6a, . . . and the security service station 8 basically have the same design. The signals included in FIG. 2 correspond to those in the flow chart of FIG. 3.

The first terminal 4 contains a first and second input and output terminal 12 and 14, respectively. The terminals 12 and 14 are connected to a processing module 16 which has associated therewith a memory 18. Stored in the memory 18 are the digital data SK.A, PK.A, PK.B, and PK.N.

Similarly, the second terminal 6 contains a first and second input and output terminal 22 and 24, respectively, a processing module 26 connected to both terminals 22 and 24 and a memory 28 associated with the module 26. In this memory 28, there are stored the digital data SK.B, PK.B, PK.A, and PK.N.

The third terminal 6a has the same design as the second terminal 6. Its memory has stored the digital data SK.C, PK.C, PK.A, and PK.N.

The security service station 8 contains a terminal 34 which serves as an input and output and which is connected to the communication network 10. It further contains a processing module 36. A memory 38 containing the digital data SK.N, PK.N, PK.A, PK.B, PK.C, and additional data representing further terminals is associated with the module 36 of the security service station 8.

For the following discussion it will be assumed that the first input and output terminal 12 of the first terminal 4 receives a start signal START, and also a message MSG for transmission to the second terminal 6. When the message MSG has been received by the second terminal 6, a receipt RCPT will be received by the first terminal 4 and subsequently issued by its output terminal 12. The output terminal 22 of the second terminal 6 will issue the message MSG in clear text. It will also issue the receipt RCPT.

In FIG. 3 is a flow chart which illustrates the steps of operation performed by the first terminal 4 associated to the subscriber A (designated as terminal A), the security service station 8 (designated as SSS), and the second terminal 6 associated to the subscriber B (designated as terminal B). In order to facilitate the reading of the flow chart, the steps performed by the terminal A are shown on the left side, the steps performed by the second terminal B are shown on the right side, and the steps performed by the security service station SSS are shown inbetween.

The following assumptions are made:
1. The security service station SSS has the correct public keys PK.A, PK.B, PK.C, ... of all the network subscribers A, B, C, ..., respectively.
2. The terminal subscribers A and B and all additional network subscribers C, D, ... have the correct public network key PK.N.
3. Only an authorized owner or user will know his secret key. For instance, the subscriber A of the first terminal 4 alone will know the first secret key SK.A.
4. The security service station SSS is completely reliable (=trustworthy). In other words, the users A, B, C, ... of the terminals 4, 6, 6a, ..., respectively, can trust the security service station SSS.
5. All subscribers A, B, C, ... are mutually suspicious. Nor can they be trusted by the security service station SSS.
6. It is not necessary to provide data storage in the security station SSS for a long period of time. Thus, the security station SSS is not a "store-and-forward message switch". Consequently, the design of the security service station SSS can be very simple; it is not required to handle the whole message or parts of the whole message for an extended period of time.

The method illustrated in FIG. 3 ensures that a message MSG which is sent from the first terminal A to the second terminal B can only be read by the second terminal B. For this purpose the message MSG is encrypted in a more elaborate way than in the embodiment of FIG. 1.

According to FIG. 3, the first terminal A has received or generated a message MSG for transmission to the second terminal B. The first terminal A now generates a message number MSG-NO.A. This message number MSG-NO.A may contain the date, the absolute time when this operation takes place, and a unique number. This message number may be considered as a time stamp. Then the first terminal A generates a DES-Key K at random. Subsequently, the address adr.A of the first terminal A, the message MSG, and the message MSG-NO.A are encrypted with the random key K. Thereby, a first encrypted message CR.1 is obtained: CR.1 = $<$adr.A, MSG, MSG-NO.A$>_K$.

Now a checksum CS.A is calculated according to CS.A=f.cs(CR.1) where f.cs is a publicly known checksum function. The checksum CS.A represents a first quantity of data defining the first encrypted message $<$MSG$>_K$. Next, the checksum CS.A and the message number MSG-NO.A are encrypted under the secret key SK.A of the first terminal A. In the next step a composed quantity of data PL.2 is formed. This composed quantity of data PL.2 contains the address adr.A, the address adr.B, the random key K, the checksum CS.A and the message number MSG-NO.A encrypted under SK.A, and the message number MSG-NO.A.

The next operational step provides for encryption of the composed quantity of data PL.2 with the public network key PK.N. Such encryption is not contained in the simplified explanation given in the description of FIG. 2. As a result, an encrypted information CR.2 is obtained. This information CR.2 is sent to the security service station SSS. It shall be noted already here that the first encrypted message CR.1 and the message number MSG-NO.A will be sent to the second terminal B later.

In the security service station SSS, the encrypted information CR.2 is decrypted by aid of the secret network key SK.N. As a result, the composed information PL.2=DECR.SK.N(CR.2) is obtained. This step is also not provided in the simplified method explained in FIG. 2.

As a next step, the encrypted information {CS.A, MSG-No.A} SK.A contained in PL.2 is decrypted with the public key PK.A of the first terminal A, thus obtaining the data CS.A and MSG-NO.A.

The decryption will yield a reasonable result only if the terminal from which this term {CS.A, MSG-NO.A} SK.A has been received is in fact the first terminal A. For instance, this authenticity check for the first terminal A may be based on the fact that the decrypted message number MSG-No.A has a certain predetermined structure (e.g. digital sequence) which is publicly known. Another possibility as the basis for an authenticity check would be to include a third parameter (aside from CS.A and MSG-NO.A) in the term to be decrypted, which third parameter is also publicly known.

If the authenticity check is positive, that is, if the sender is in fact the first terminal A, the operation continues. If not, the operation stops.

In the next operational step, the time stamp MSG-NO.A is checked. In this step, the security service station SSS determines whether the time information contained in the message number MSG-NO.A fits into a predetermined time window. If this time stamp check is negative, the operation stops. However, if the time stamp check is positive, the composed plurality of data PL.2 is temporarily stored in the security service station SSS. The operation in the security service station SSS will continue as soon as additonal information CR.3 is received from the second terminal B.

Meanwhile the first terminal A sends the information (CR.1, MSG-NO.A) to the second terminal B, as indicated above. Here in the second terminal B, a second checksum CS.B is calculated according to CS.B=f.cs(CR.1), wherein f.cs is again a publicly known checksum function and wherein CR.1 is the encrypted message received from terminal A. In the next step, the second terminal B generates a second message number MSG-NO.B. Again this message number is comprised of the date, the time of operation, and a unique number. It may be considered as a time stamp. Subsequently, a composed quantity of data PL.3 is formed. This composed quantity of data PL.3 comprises the address adr.B of the second terminal B, the calculated second checksum CS.B, the first message number MSG-NO.A, and the second message number MSG-NO.B.

In the next step, the composed quantity of data PL.3 is encrypted with the secret key SK.B of the second terminal B. The encrypted information CR.3 thus obtained is sent to the security service station SSS.

In the security service station SSS, the encrypted information CR.3 is decrypted with the public key PK.B of the second terminal B. As a result, the composed quantity of data PL.3 is obtained. Similarly as with the first terminal A, an authenticity check is performed for the second terminal B. If the check is negative, the procedure stops. However, if the check is positive, the security service station SSS looks up the information stored under the first message number MSG-NO.A. Subsequently, another check is performed. The security service station SSS determines whether the actual time and the time stamps of both the first and second message numbers MSG-No.A and MSG-No.B, respectively, agree within predefined limits. If not, the operation stops. If the time check is positive, a next check is performed. The security service station SSS determines whether the first quantity of data CS.A equals the second quantity of data CS.B. Thus it checks whether both terminals A and B have supplied the same information CS.A and CS.B, respectively. It will be noted that this is not an authenticity check. If the check is negative, the operation stops. However, if the check is positive, the procedure continues with the preparation of a receipt RCPT.

For the sake of simplicity, it is set: CS=CS.A=CS.B. The receipt RCPT is prepared from the following data: adr.A, adr.B, CS, MSG-NO.A, MSG-No.B, and K. These data are encrypted with the secret network key SK.N to form the receipt RCPT. In the next step, the address adr.SSS of the security service station SSS and the receipt RCPT are encrypted under the public key PK.B of the second terminal B, thereby obtaining an encrypted quantity of data CR.4. It should be mentioned, that this step was omitted in the simplified embodiment shown in FIG. 1. This encrypted quantity of data CR.4 is sent to the second terminal B.

In the second terminal B, the encrypted data quantity CR.4 is decrypted with the secret key SK.B of the second terminal B, and the receipt RCPT is obtained. The receipt RCPT is decrypted with the public network key PK.N, and the random key K is read from the decrypted receipt RCPT. It will be noted that the random key K has not been obtained from the first terminal A, but from the security service station SSS. In the next step, the second terminal B decrypts the encrypted message CR.1 with the random key K just provided, and the message MSG will be obtained in clear text. The message MSG will be stored along with the receipt RCPT in the second terminal B.

In the next step, the second terminal B forms an acknowledgement ack.B. This acknowledgement ack.B is composed of the address adr.B. and of the random key K which are both encrypted under the secret key SK.B, which quantity of data in turn is encrypted under the public network key PK.N. The acknowledgement ack.B is sent to the security service station SSS where it is stored.

The security service station SSS forms an encrypted quantity of data CR.5. It will also be noted that this step was not performed in the simplified embodiment presented in FIG. 1. The encrypted data quantity CR.5 contains the address adr.SSS of the security service station SSS and the receipt RCPT, both informations encrypted under the public key PK.A of the first terminal A. The encrypted data quantity CR.5 is transmitted to the first terminal A.

In the first terminal A, the data quantity CR.5 is decrypted with the secret key SK.A of the first terminal A, and the receipt RCPT is obtained. The receipt RCPT is stored with the message MSG. Subsequently, the first terminal A forms an acknowledgement ack.A of its own which is the address adr.A of the first terminal A encrypted under the secret key SK.A of the first terminal A. This acknowledgement ack.A is sent to the security service station SSS where it is stored.

In the next operational step, the security service station SSS checks whether the two acknowledgements ack.A and ack.B have been received. If not, the station SSS will wait until further steps are taken. If both acknowledgements have been received, all information which is transaction specific may be cancelled or destroyed in the security service station SSS. The procedure for message acknowledgement is completed.

It should be noted that the transmission of ack.A and ack.B is included only to speed up the completion of the transaction. Even if terminal B should not be cooperative, i.e. it does not send ack.B, nevertheless the cryptogram CR.5 containing the receipt RCPT is sent to terminal A.

Figures 4, 4A:
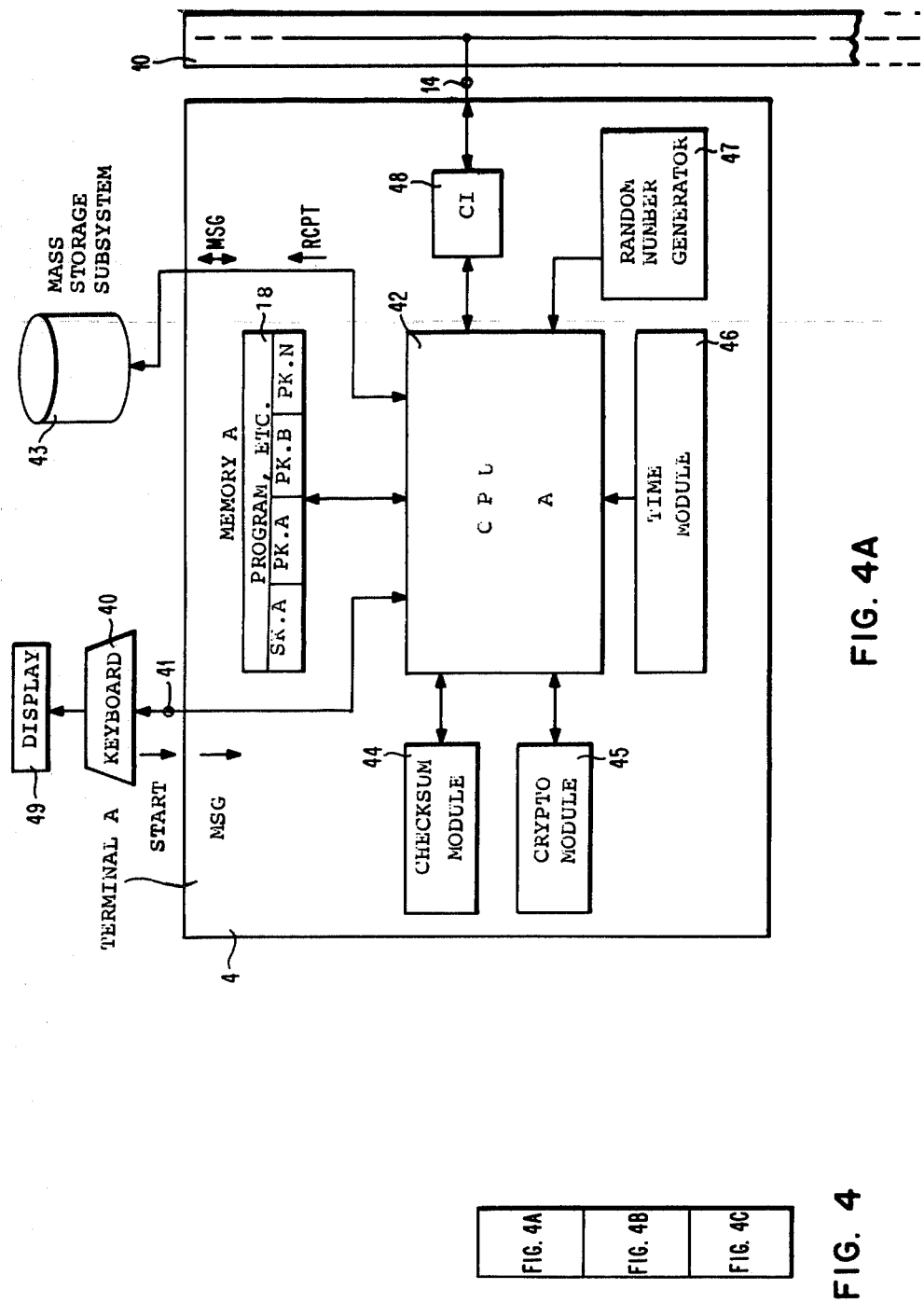
FIG. 4 is an even more detailed diagram of a communication system incorporating Registered Mail features according to the invention.
Figure 4B:
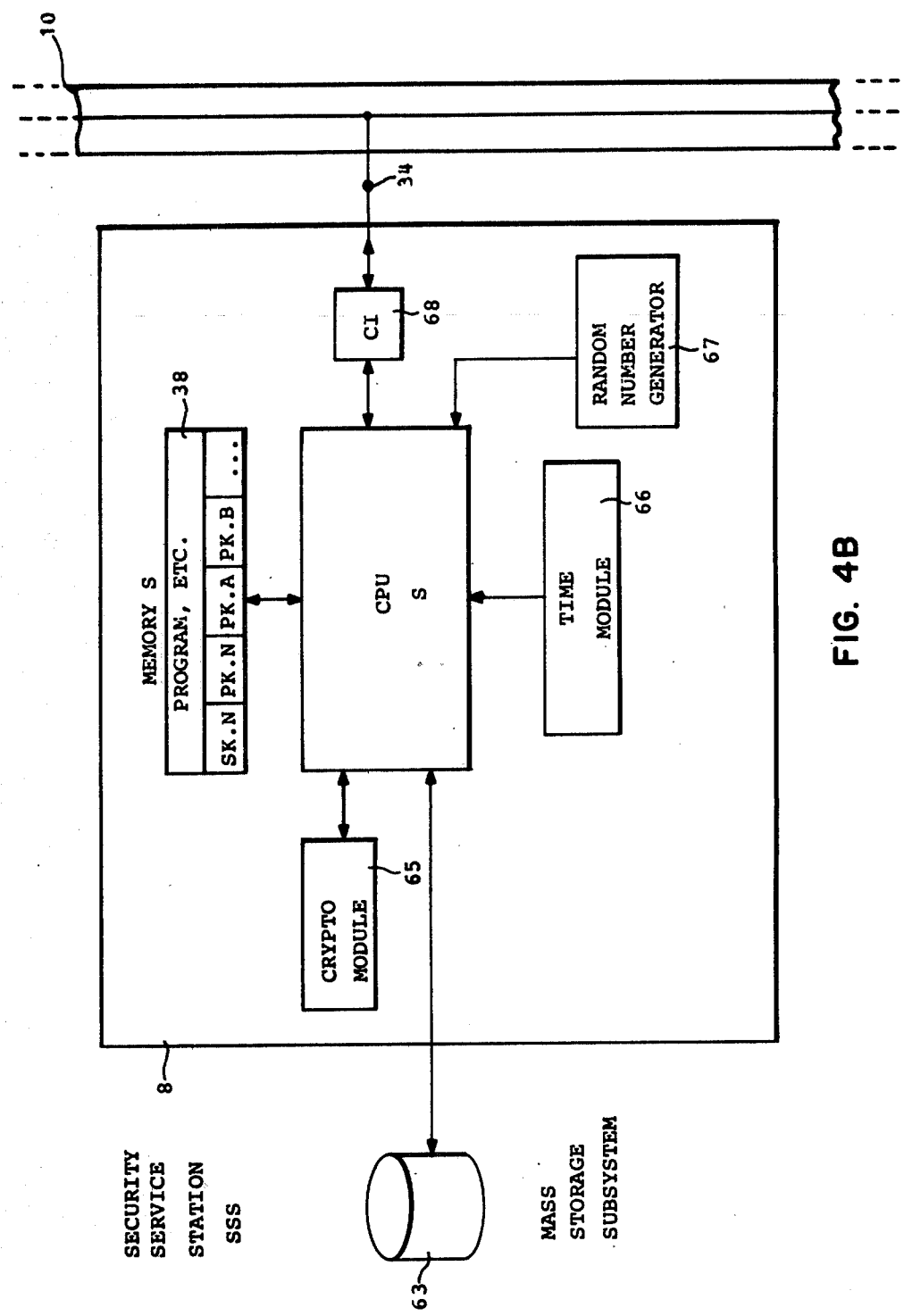
Figure 4C:
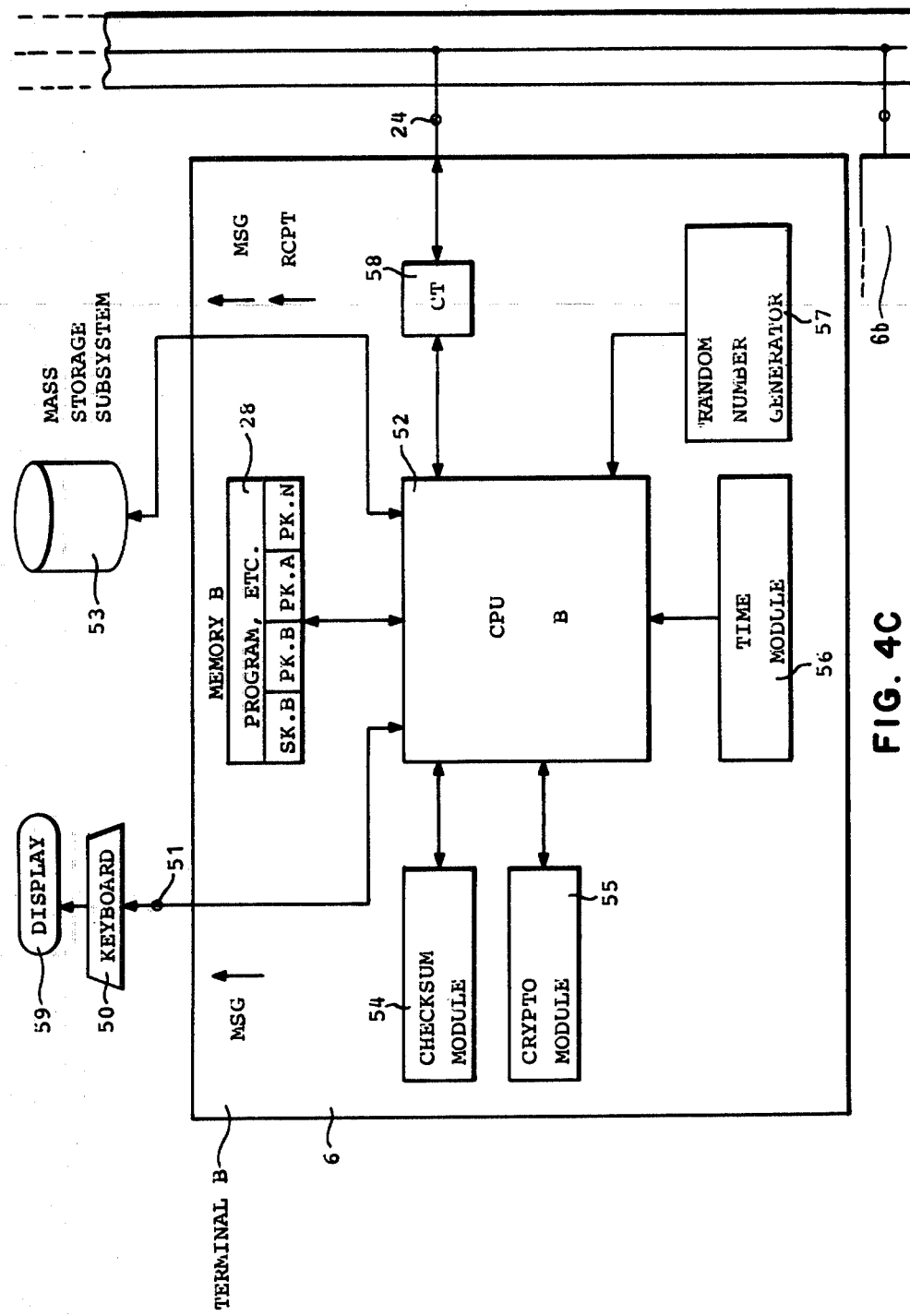

In FIG. 4 another embodiment of an electronic communication system 2 is illustrated. This communication system 2 shows more details than the system illustrated in FIG. 2.

The communication system 2 according to FIG. 4 also includes a first terminal 4, a second terminal 6, further terminals 6b, . . . , and a security service station 8.

A message MSG is introduced from a keyboard 40 into the input and output terminal 41 of the first terminal 4. This is performed under the control of a central processing unit 42. The message MSG is stored on a non-volatile mass storage subsystem 43, for instance a hard disk. This mass storage subsystem 43 will subsequently also be used to store a receipt RCPT.

Upon receiving a start signal START from the keyboard 40, the central processing unit 42 reads the message MSG from the mass storage subsystem 43 and processes it, thereby using a checksum module 44, a cryptomodule 45, a time module 46, and a random number generator 47. The memory 18 which is associated with the central processing unit 42 contains a program and the digital data SK.A, PK.A, PK.B, and PK.N. These digital data are a secret key SK.A and a public key PK.A which keys are specifically assigned to the first terminal A, a public key PK.B specifically assigned to the second terminal B, and a public network key PK.N. Reading of the message MSG from the mass storage subsystem 43 is performed under the control of the program stored in the memory 18.

The checksum module 44 compresses a long string of input data to a short checksum defining the input data string such that it is practically impossible for an intruder to find a different string of data which produces the same checksum. The checksum module 44 can be realized, for example, by using the so-called Data Encryption Standard (Davis, ICCC 1980, DESFIPS Publ.). The checksum module 44 thus is a smaller preprocessing unit.

The cryptomodule 45 contains preferably a PKC cryptomodule. It can be loaded with DES keys or with public or secret keys from the memory 18. Upon a command, it transforms an input data string into a output data string by encryption or decryption according to a Public Key algorithm or the Data Encryption Standard. The cryptomodule 45 comprises, for example, a Data Encryption Standard cryptochip (see, for instance, Western Digital Product Description WD2001) and an RSA cryptochip (R. Rivest, "A Description of a Single-Chip Implementation of the RSA Cipher", Lambda, IV/1980.)

The time module 46 is used by the central processing unit 42 to read the date and the time. This information is needed, as previously stated, if time stamps are to be produced.

The random number generator 47 returns a pseudo random number upon input of a seed value, or more preferably, it generates and returns a real random number, which may be e.g. derived from resistor noise. Instead of a specific generator 47, the random number K may be generated by aid of the stored program and of the central processing unit 42.

After the central processing unit 42 has processed an information, it transmits this information via a communication interface 48 and the communication network 10 either to the security service station 8 or to the second terminal 6. The communication interface 48 is also used for receiving information from the communication network 10.

A display device 49 is connected via the keyboard 40 to the central processing unit 42. Thus, any desired data developed in or through the central processing unit 42 can be displayed.

The second terminal 6 has also a keyboard 50 connected to an input and output terminal 51 leading to a central processing unit 52. There is also a non-volatile mass storage subsystem 53 connected to the central processing unit 52. Associated with the central processing unit 52 are a checksum module 54, a cryptomodule 55, a time module 56, a random number generator 57, and a communication interface 58. A display device 59 is connected via the keyboard 50 to the unit 52. All units 50 through 59 are similar or identical to the respective units 40 through 49 used in the first terminal 4.

The memory 28 of the central processing unit 52 contains a program, a secret key SK.B and a public PK.B which keys are specifically assigned to the second terminal 6, the public key PK.A of the first terminal 4, and the public network key PK.N. The display device 59 is used to display the received message MSG and the issued receipt RCPT.

The security service station 8 also contains a central processing unit 62. This unit 62 executes programs which are stored in its associated memory 38. In addition to the program, the memory 38 contains the secret network key SK.N, the public network key PK.N, the public keys PK.A, PK.B, . . . of the terminals 4, 6, . . . , and further variables. Connected to the central processing unit 62 is a non-volatile mass storage subsystem 63, e.g. a hard disk. This mass storage subsystem 63 is used for temporary storage of data such as RCPT, ACK.A, ACK.B, etc.

For data exchange with the central processing unit 62, there are also provided a cryptomodule 65, a time module 66 and a random number generator 67. A communication interface 68 connects the unit 62 to the communication network 10. The units 65 through 68 are similar to the units 45-48 and 55-58 used in the terminals 4 and 6, respectively. The central processing unit 62 can send messages to and receive messages from the communication network 10 via the communication interface 68.

Figure 5A:
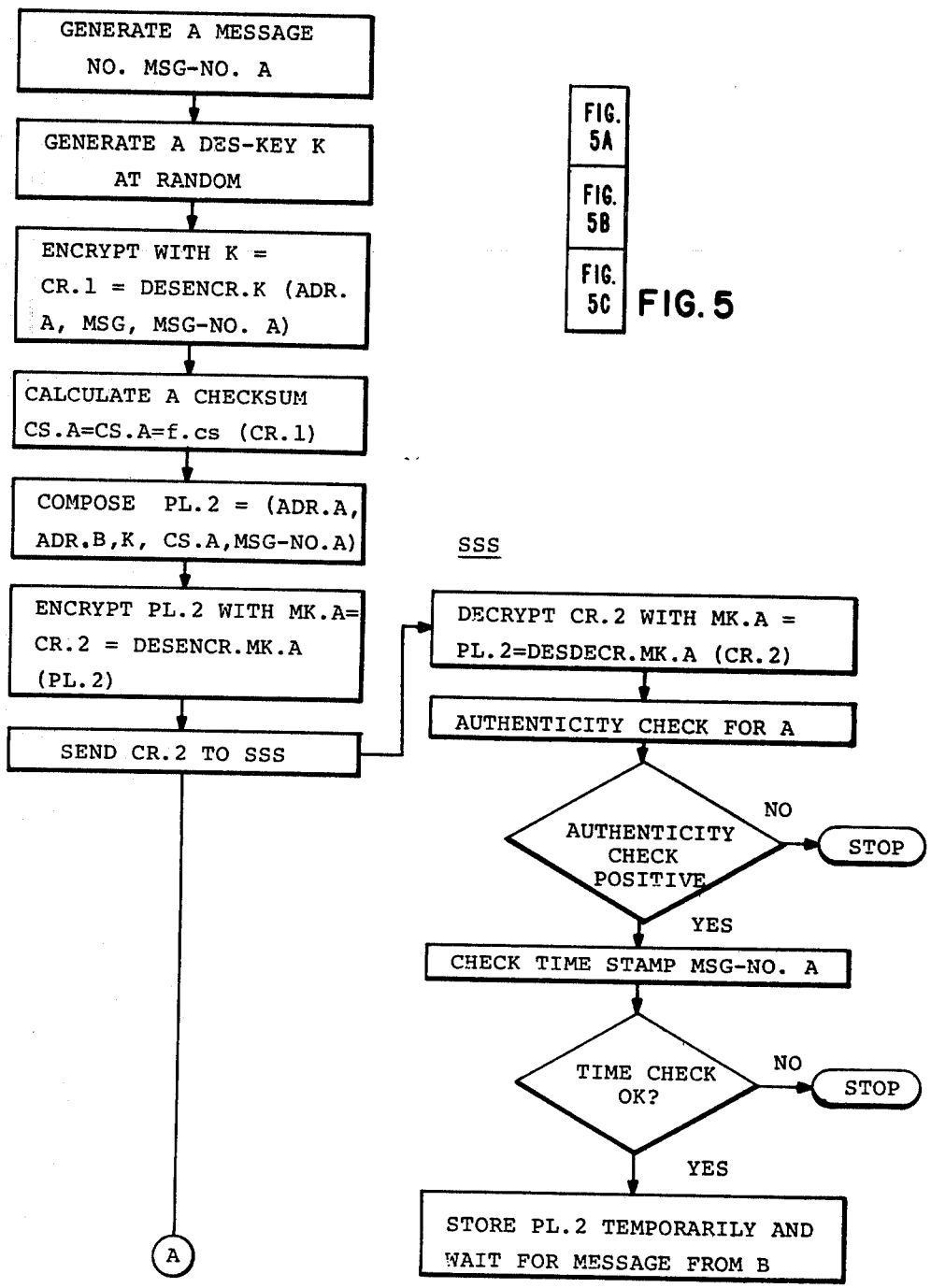
FIG. 5 is another flow-chart illustrating a message acknowledgement procedure in a symmetrical DES system.
Figure 5B:
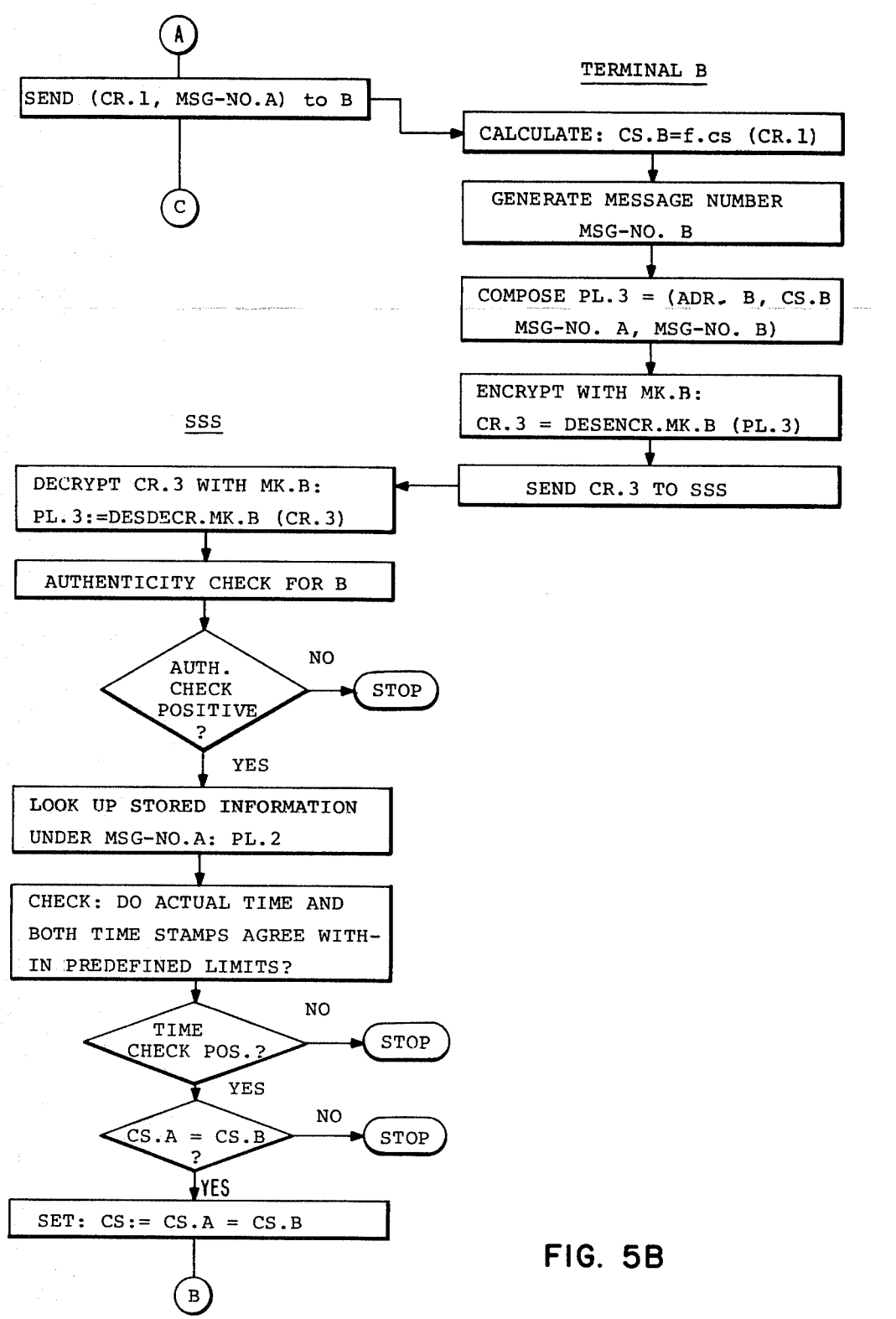
Figure 5C:
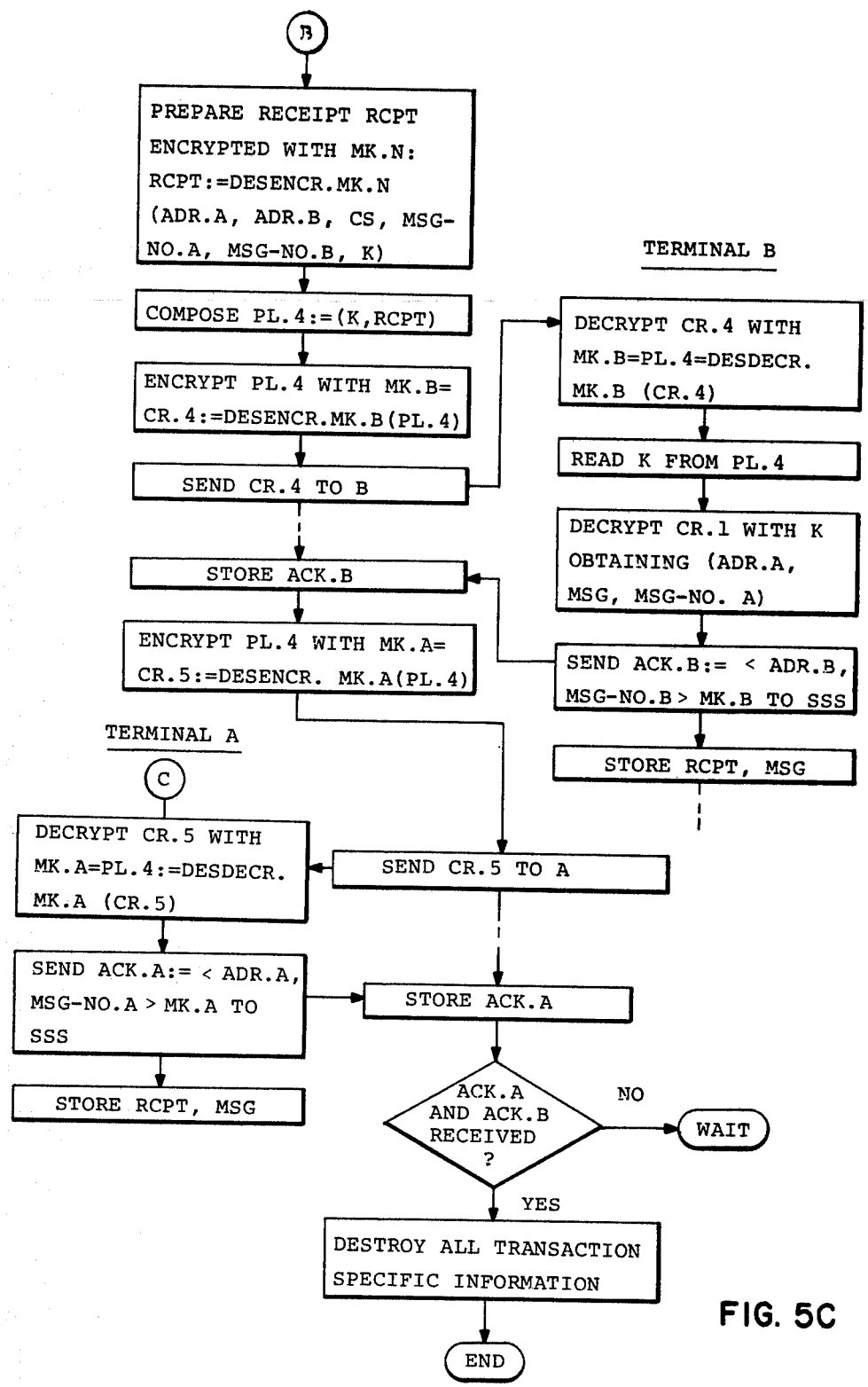

In FIG. 5 is illustrated a message acknowledgement procedure for the symmetric case. In this case, there are no public keys PK.A and PK.B and no secret keys SK.A and SK.B associated with the first and the second terminal A and B, respectively. Further in contrast to FIG. 3, no use is made of a public network key PK.N and a secret network key SK.N.

The flow chart of FIG. 5 is similar to the flow chart of FIG. 3. However, there are several differences. It will be noted that the composed quantity of data PL.2 is similarly composed of several data, that is adr.A, adr.B, K, CS.A, and MSG-NO.A, but PL.2 is not encrypted under a secret key SK.A. It will also be noted that subsequently the DES encryption of PL.2 takes place with a secret key MK.A specifically assigned to the first terminal A, and not with a public network key PK.N.

Correspondingly, in the security service station SSS the quantity of data CR.2 is decrypted with the secret key MK.A and not with a public key PK.A.

Similarly, in the second terminal B the DES encryption of the composed quantity of data PL.3 takes place with a secret key MK.B which is specifically assigned to the second terminal B, and not with a secret key SK.B. This encryption leads to the encrypted quantity of data CR.3.

Correspondingly, in the security service station SSS the quantity of data CR.3 is decrypted with the secret key MK.B, and not with a public key PK.B.

Another difference is that in FIG. 5 a data quantity PL.4 is composed in the security service station SSS of the random number K and the receipt RCPT. This composed quantity PL.4 is subsequently DES encrypted with the key MK.B assigned to the second terminal B in order to form CR.4. In the second terminal B, the data quantity CR.4 is decrypted with the key MK.B, thereby obtaining the composed quantity PL.4. From PL.4, the random number K is read. Subsequently the encrypted quantity CR.1 is decrypted with the random key, thereby obtaining the data adr.A, MSG, and MSG-NO.A. It will also be noted that the acknowledgement ack.B formed by the second terminal B is also different from the acknowledgement ack.B formed in FIG. 3. This difference also applies to the first acknowledgement ack.A formed in the first terminal A.

Figure 6:
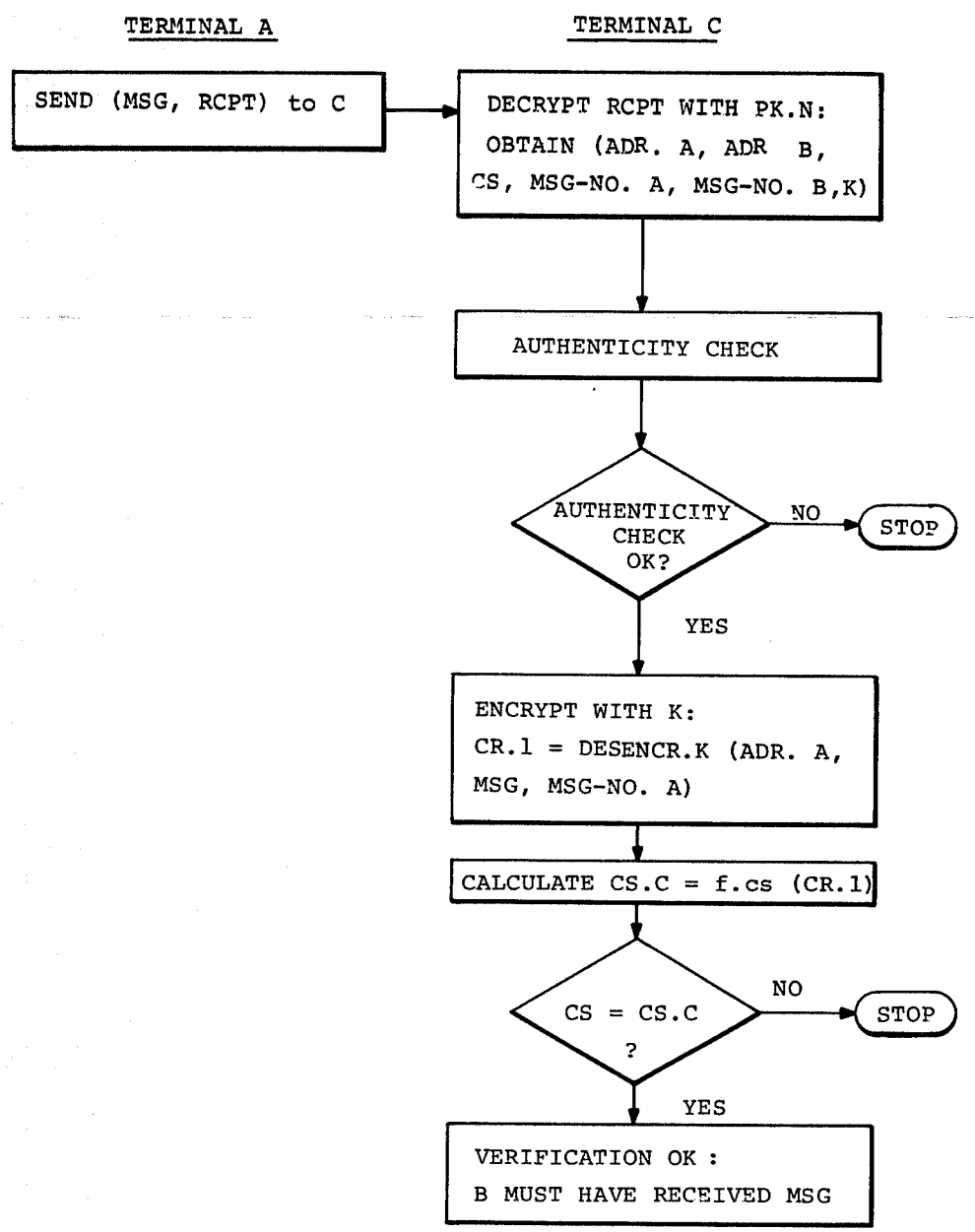
FIG. 6 is still another flow-chart illustrating a dispute in a PKC system where the receiver disclaims having received a message from a sender.
Figure 7B:
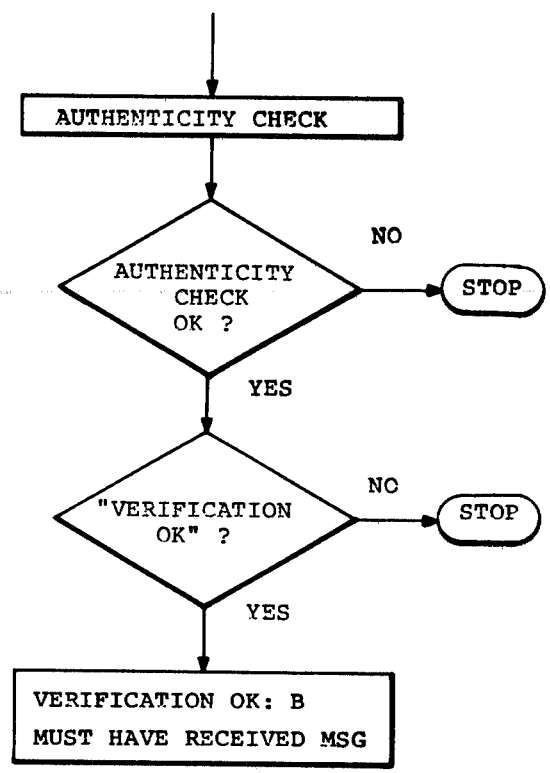
FIG. 7 is still another flow-chart illustrating a dispute in a symmetrical DES system where the receiver disclaims having received a message.
Figure 7:
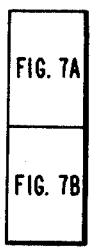
Figure 7A:
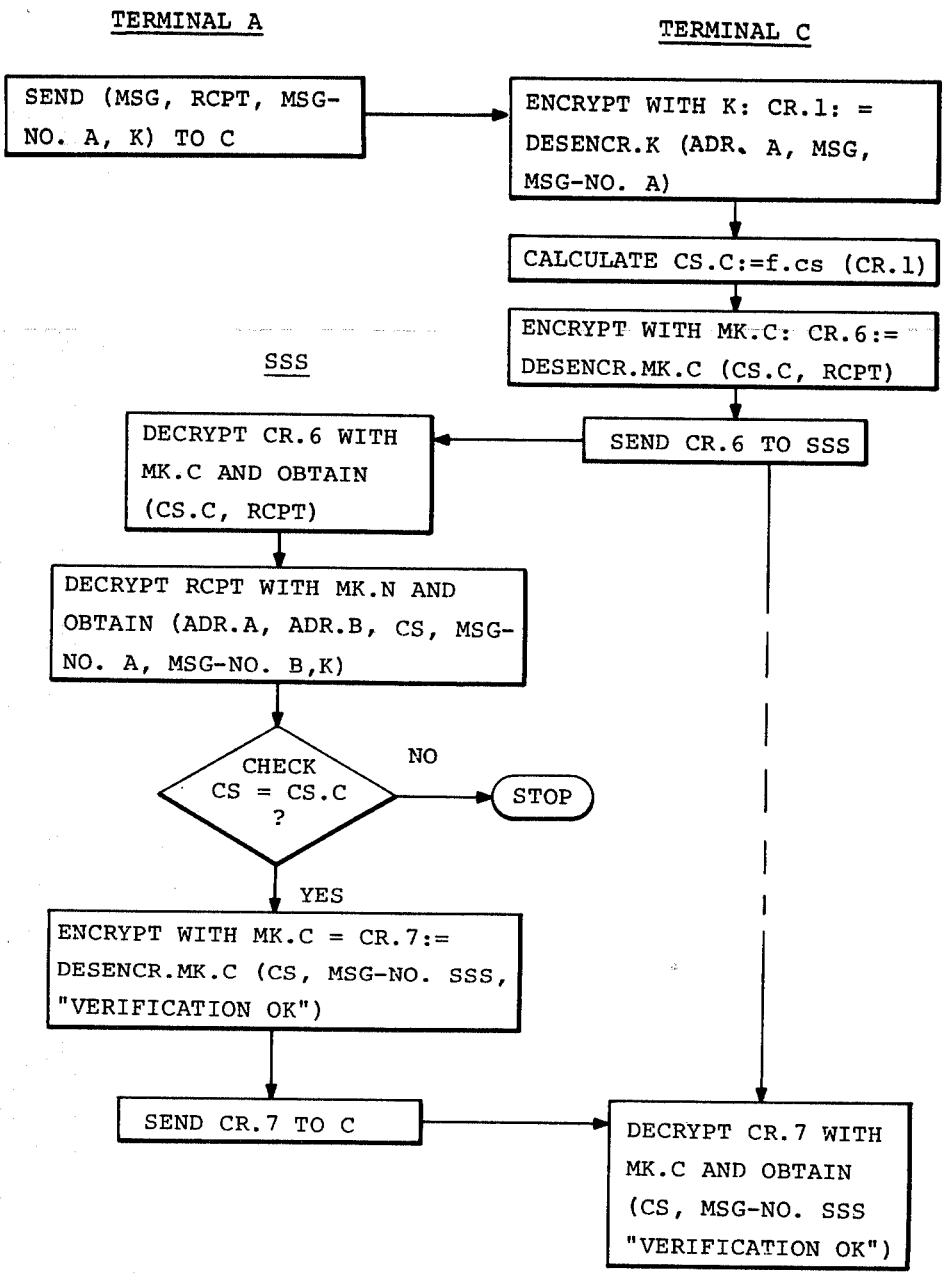

In FIGS. 6 and 7 are illustrated so-called "dispute diagrams". Here is it assumed that the user of the second terminal B disclaims having received the message MSG from the first terminal A. In the diagrams illustrated in FIGS. 6 and 7, the user of a third terminal C verifies the receipt RCPT which is presented to the third terminal C. FIG. 6 refers to a PKC system, and FIG. 7 refers to a symmetrical DES system.

According to FIG. 6, the first terminal A sends the combined information (MSG, RCPT) to the third terminal C which is designed in analogy to the terminals A and B. The third terminal C decrypts the receipt RCPT with the public network key PK.N, and obtains the information (adr.A, adr.B, CS, MSG-NO.A, MSG-NO.B, K). Subsequently the third terminal C performs an authenticity check. That is, that third terminal C determines whether the receipt RCPT was "signed" or encrypted by the security service station SSS. If the result is negative, the procedure stops. In this case, the doubts of the user of the second terminal B seem to be justified. If the authenticity check is positive the third terminal C encrypts the data (adr.A, MSG, MSG-NO.A) with the random key K, thereby obtaining CR.1. Subsequently the third terminal C calculates a checksum CS.C=f.cs(CR.1), wherein f.cs is again the function mentioned above. In the next step, the third terminal C determines whether the checksum CS of the first and second terminal A and B equals the checksum CS.C of the third terminal C. If this is not true, the procedure stops. If, however, CS equals CS.C, then the verification is made. That is, the second terminal B must have received the message MSG.

As mentioned above, FIG. 6 refers to a PKC system. In FIG. 7, a symmetrical system, in particular a DES system, is contemplated.

According to FIG. 7 the first terminal A sends the information (MSG, RCPT, MSG.-NO.A, K) to the third terminal C. Here the information (adr.A, MSG, MSG-NO.A) is DES encrypted with the random key K, thereby obtaining the encrypted quantity CR.1. In the next step, a checksum CS.C=f.cs(CR.1) is calculated, as above. The data CS.C and RCPT are subsequently DES encrypted with the key MK.C assigned to the third terminal C, thereby obtaining an encrypted quantity of data CR.6. This encrypted quantity of data CR.6 is sent to the security service station SSS.

In the security service station SSS, the data CR.6 are DES decrypted with the key MK.C. Thereby, the security service station SSS obtains the checksum CS.C and the receipt RCPT. In the next step the receipt RCPT is DES decrypted with a key MK.N. As a result, the data (adr.A, adr.B, CS, MSG-NO.A, MSG-No.B, K) are obtained. These data contain the checksum CS.

Subsequently the checksum CS is checked against CS.C. If their values are not equal, the procedure stops. If both values CS and CS.C are equal, the security service station SSS DES encrypts the checksum CS, the message number MSG-No. SSS of the service station SSS, and an information representing "verification okay" with the key MK.C. As a result, a quantity of encrypted data CR.7 is furnished.

This quantity CR.7 is sent to the third terminal C, where it is DES decrypted with the key MK.C assigned to the third terminal C. As a consequence, the data (CS, MSG-No.SSS, "verification okay" are obtained.

In the next step an authenticity check is performed in the third terminal C. Here the third terminal C checks whether the information received is from the security service station SSS or not. If the authenticity check is negative, the procedure stops. If, however, the authenticity check is positive, the third terminal C determines whether the data representing the "verification" are okay. If this is not the case, the procedure stops. If, however, the "verification" is positive, this is an indication that the second terminal B has indeed received the message MSG.

The random key K as defined in the description of FIGS. 1–7 is a key which cannot be determined by an observer outside the first terminal A. Thus, it may be a randomly generated key, or a key generated according to a secret pattern, such as a pseudo-random pattern.

The system and methods described above are secure with respect to various attacks. Some advantages of the described embodiments will become apparent when possible security attacks are considered. These advantages will subsequently be illustrated with respect to FIGS. 2–4.

One could think of the following security attacks (the features which defend such attacks are listed subsequently as "solutions"):

1. The terminal A or B sends a wrong time stamp MSG-NO.A or MSG-NO.B, respectively.
    Solution: All time stamps are checked by the security service station SSS. Therefore, the time stamp errors are detected.

2. Someone tries to impersonate the user of the terminal A.
    Solution: The terminal A signs the information (CS.A, MSG-NO.A) with the secret key SK.A. The station SSS performs an authenticity check with the public key PK.A.

3. The terminal B sends no answer to the station SSS upon receipt of CR.1.
    Solution: The terminal B cannot read CR.1 without the key K.

4. The sender A sends the key K to the station SSS, but encrypts CR.1 with a different key K', or the sender A sends a random number CR.1' instead of CR.1 and makes sure that f.cs(CR.1')=f.cs(CR.1). Neither attacks can be detected by the receiver B until after the receiver B has already sent his receipt. This is equivalent to sending an empty envelope by registered paper mail.
    Solution: This problem could not be resolved by a third party because the sender A as well as the receiver B might have changed CR.1 to CR.1' with f.cs(CR.1)=f.cs(CR.1').
    However, if we assume a checksum of a length of, for instance, at least 64 bits, then it takes about 263=(1019) or more tries to find a CR.1' with a probability of 50%. This means that the receiver B can even prove that he received an "empty envelope" or a "garbage message", if this holds true.

5. The receiver B claims that anybody else (for example, the sender A) has sent PL.3 to the station SSS, and that the receiver B did not receive anything.
    Solution: The receiver B signs PL.3 with the key SK.B. This signature is checked by the station SSS before the receipt with K is sent out.

Some additional advantages are as follows:

6. The responsibility for signed letters and for receipts is with the users A and B. Handling by the central authorities is only on a temporary basis. This is very similar to features of the conventional registered mail system relating to paper mail. In other words, the present electronic registered mail system has the features of "decentralized responsibility". That is, evidence for a complete transaction is stored at the location of the unsers A and/or B, not in a central facility such as a central location under the responsibility of the carrier or communication system.

In the ordinary mail system, the evidence for a received letter is generally not stored in the general post office, but retained by the user(s).

7. In the present registered mail system the receiver B can prove what the contents of the transmitted message was, for which the receiver has signed the receipt. As in the conventional registerd mail system, so-called "empty envelopes" or "garbage letters" are possible, but in the present system it is provable that no message or a trivial message was received.

8. The present registered mail system is not sensitive to failures of the communication network. In particular, it is safe against breakdowns of the transmission. Also, recoveries from network breakdowns are possible.

9. Due to the so-called "time stamp mechanism", the points of time of individual transactions are traceable by a third party. This is performed by the initialization of the registered mail procedure by the sender A and by a time stamp at the point of signing the receipt. The time stamp mechanism provides proof that a transaction has occurred at a specific time.

10. The apparatus described above represent fully electronic implementations of the previously known registered mail features.

11. The apparatus contains a simple implementation of the central station SSS.

12. If the PKC is used, it is not necessary to store secret information for a long time. The secret network key can be destroyed. Only the public network key PX.N is needed for the verification procedure. In particular, an extensively long data storage in the central station SSS is not necessary.

While the forms of the method and apparatus herein described constitute preferred embodiments of the invention, it is to be understood that the invention is not limited to these precise forms of procedure, and that a variety of changes may be made therein without departing from the scope of the invention.

Reference numerals have been incorporated into the patent claims merely for illustration, not for restriction of the scope of this invention.

What is claimed is:

1. A method for providing a security feature in an electronic communication system, wherein said communication system contains a first and a second terminal and a conmmunication network, wherein said first terminal is provided for sending a message to said second terminal, wherein said second terminal is provided for receiving said message, and wherein a security service station is provided to communicate with said first and second terminal via said communication network, comprising the steps of:

(a) in said first terminal (A), generating a key (K) at random;

(b) in said first terminal (A), encrypting said message (MSG) with said random key (K), thereby obtaining a first encrypted message:

$$<MSG>_K;$$

(c) in said first terminal (A), deriving a first quantity of data (CS.A= $<MSG>_K$ in FIG. 1) defining said first encrypted message ($<MSG>_K$) and composing from said first quantity of data (CS.A) and from said key (K) a composed data quantity: (K, CS.A)

(d) in said first terminal (A), encrypting said composed data quantity with a first secret key (SK.A) which is specifically assigned to said first terminal (A), thereby obtaining a first encrypted composed quantity of data:

$$\{K,CS.A\}SK.A$$

(e) sending said first encrypted compound quantity of data ($\{K,CS.A\}SK.A$) from said first terminal (A) to said security service station (SSS);

(f) sending said first encrypted message ($<MSG>_K$) from said first terminal (A) to said second terminal (B);

(g) in said second terminal (B), deriving a second quantity of data (CS.B= $<MSG>_K$ in FIG. 1) defining said first encrypted message ($<MSG>_K$) received from said first terminal (A) and encrypting said second quantity of data with a second secret key (SK.B) which is specifically assigned to said second terminal (B), thereby obtaining a second encrypted quantity of data:

$$CR.3=\{<MSG>_K\}SK.B;$$

(h) sending said second encrypted quantity of data (CR.3) from said second terminal (B) to said security service station (SSS);

(i) in said security service station (SSS), decrypting said first encrypted composed quantity of data ($\{K,CS.A\}SK.A$) received from said first terminal (A) with a first predetermined key (PK.A) which is specifically assigned to said first terminal (A), thereby obtaining said first quantity of data (CS.A) and said random key (K);

(j) in said security service station (SSS), decrypting said second encrypted quantity of data (CR.3) received from said second terminal (B) with a second predetermined key (PK.B) which is specifically assigned to said second terminal (B), thereby obtaining said second quantity of data (CS.B);

(k) in said security service station (SSS), determining if said first quantity of data (CS.A) is equal to said second quantity of data (CS.B);

(l) if so (CS.A =CS.B),in said security service station (SSS), composing a receipt information (RC in FIG. 1) comprising said random key (K) and said first quantity of data (CS.A):

$$RC=K,CS.A;$$

(m) in said security service station (SSS), encrypting said information (RC) with a secret network key (SK.N) specifically assigned to said security service station (SSS),thereby obtaining a receipt (RCPT):

$$RCPT(K)=\{RC\}SK.N;$$

(n) sending said receipt (RCPT) from said security service station (SSS) to said first terminal (A);

(o) sending said receipt (RCPT) and random key information (K) from said security service station (SSS) to said second terminal (B);

(p) in said second terminal (B), extracting said random key (K) from said random key information; and (q) in said second terminal (B), decrypting said first encrypted message ($<MSG>_K$) with said random key (K), thereby obtaining said message (MSG) in clear text. (FIG. 1).

2. The method according to claim 1, wherein a non-symmetrical cryptosystem is used, wherein said first predetermined key is a first public key (PK.A), wherein said second predetermined key is a second public key (PK.B), and wherein said receipt (RCPT) contains said random key information, further comprising the step of, in said second terminal (B), decrypting said receipt (RCPT) with a public network key (PK.N) specifically assigned to said security service station, thereby obtaining said receipt information (RC), and extracting said random key (K) from said receipt information (RC) for decryption of said first encrypted message ($<MSG>_K$).

3. The method according to claim 1, wherein a symmetrical cryptosystem is used, wherein said first predetermined key is said first secret key, wherein said second predetermined key is said second secret key, and wherein said random key information sent to said second terminal (B) is said random key (K) proper.

4. The method according to claim 1, wherein said first encrypted quantity of data ({K,CS.A}SK.A) is sent in an encrypted form (CR.2) from said first terminal (A) to said security service station (SSS).

5. The method according to claim 1, wherein said receipt (RCPT) is sent in an encrypted form (CR.5) from said security service station (SSS) to said first terminal (A).

6. The method according to claim 1, wherein said receipt (RCPT) and said random key information are sent in an encrypted form (CR.4) from said security service station (SSS) to said second terminal (B).

7. The method according to claim 1, further comprising the step of inserting time stamp information into said receipt (RCPT) in said security service station (SSS).

8. The method according to claim 1, further comprising the step of sending a first signed acknowledgement signal (ACK.A) from said first terminal (A) to said security service station (SSS), after said first terminal (A) has received said receipt (RCPT).

9. The method according to claim 1, further comprising the steps of sending a second signed acknowledgement signal (ACK.B) from said second terminal (B) to said security service station (SSS), after said second terminal (B) has received said receipt (RCPT).

10. The method according to claim 1, wherein said security service station (SSS) receives an acknowledgement signal (ACK.A; ACK.B) from one of said terminals (A;B), further comprising the step of eliminating data in said security service station (SSS), said data having been received from at least one of said terminals (A,B).

11. An apparatus for message acknowledgement in a communication system which is provided for transmitting digital data, comprising in combination:

(a) a communication network (10) for transmitting said digital data;

(b) a first terminal (4) connected to said communication network (10), said first terminal (4) containing (b1) a first central processing unit (42) having a first memory (18) for storage of a program, of a first predetermined user key (PK.A), of a first secret user key (SK.A), and of variables (PK.B,etc.);

(b2) first non-volatile storage means (43) for storing a message (MSG) and a receipt (RCPT);

(b3) input means (40) for introducing said message (MSG) into said first memory (18) under the control of said first processing unit (42);

(b4) a first cryptomodule (45) connected to said first central processing unit (42), said first cryptomodule (45) being adapted to encrypt and decrypt data received from said first memory (18) under the control of said first central processing unit (42), said first cryptomodule (45) thereby encrypting said message (MSG);

(c) a second terminal (6) connected to said communication network (10), said second terminal (6) containing (c1) a second central processing unit (52) having a second memory (28) for storage of a program, of a second predetermined user key (PK.B), of a second secret user key (SK.B), and of variables (PK.A; etc.);

(c2) second non-volatile storage means (53) for storing said message (MSG) and said receipt (RCPT);

(c3) a second cryptomodule (55) connected to said second control processing unit (52), said second cryptomodule (55) being adapted to encrypt and decrypt data received from said second memory (28) under the control of said second central processing unit (52), said second cryptomodule (55) thereby decrypting said message (MSG);

(c4) output means (50) for delivering said message (MSG);

(d) a security service station (8) containing (d1) a third central processing unit (62) having a third memory (38) for storage of a program, of a secret network key (SK.N), of predetermined user keys (PK.A; PK.B), and of variables;

(d2) third non-volatile storage means (63) connected to said third central processing unit (62) for temporarily storing digital data; and (d3) a third cryptomodule (65) connected to said third central processing unit (62), said third cryptomodule (65) being adapted to encrypt and decrypt data received from said third memory (38) under the control of said third central processing unit (62).

12. The apparatus according to claim 11, further comprising time determining means (46) connected to said first central processing unit (42).

13. The apparatus according to claim 11, further comprising a checksum module (44) connected to said first control processing unit (42).

14. The apparatus according to claim 11, further comprising means (47) for generating a random number (K).

15. The apparatus according to claim 11, wherein said first predetermined user key (PK.A), and said second predetermined user key (PK.B) are public keys.

16. The apparatus according to claim 11, wherein said first predetermined user key (PK.A) and said second predetermined user key (PK.B) are secret keys.

* * * * *